United States Patent
Yang et al.

(10) Patent No.: US 6,719,952 B1
(45) Date of Patent: Apr. 13, 2004

(54) FLUIDIZED BED REACTION DESIGN

(75) Inventors: Wen-Ching Yang, Export, PA (US); David F. McLaughlin, Oakmont, PA (US); Timothy L. Francis, Ogden, UT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/507,605

(22) Filed: Feb. 21, 2000

(51) Int. Cl.$^7$ .................................................. B01J 8/18
(52) U.S. Cl. ........................ 422/139; 422/143; 422/211; 422/220; 422/231
(58) Field of Search ................................ 422/139–147, 422/211, 212, 213, 215, 219, 230–231, 240; 34/576, 582–583, 585, 589; 48/77, 101, 62 R, 89

(56) References Cited

U.S. PATENT DOCUMENTS

| | | | | |
|---|---|---|---|---|
| 2,946,668 A | * | 7/1960 | Richelsen | 422/199 |
| 3,309,784 A | * | 3/1967 | Adams | 34/582 |
| 3,661,558 A | * | 5/1972 | Heath et al. | 423/110 |
| 3,772,999 A | * | 11/1973 | Miller et al. | 110/245 |
| 3,981,690 A | * | 9/1976 | Chen et al. | 48/73 |
| 3,989,446 A | * | 11/1976 | Grill et al. | 432/14 |
| 4,075,953 A | * | 2/1978 | Sowards | 110/245 |
| 4,198,210 A | * | 4/1980 | Worley et al. | 48/77 |
| 4,282,010 A | * | 8/1981 | Cherish et al. | 48/77 |
| 4,308,806 A | * | 1/1982 | Uemura et al. | 110/244 |
| 4,532,155 A | * | 7/1985 | Golant et al. | 427/213 |
| 4,569,681 A | * | 2/1986 | Haldipur | 48/206 |
| 4,776,388 A | * | 10/1988 | Newby | 165/104.18 |
| 5,423,133 A | * | 6/1995 | Annen et al. | 34/585 |

FOREIGN PATENT DOCUMENTS

| | | | | |
|---|---|---|---|---|
| EP | 150091 A2 | * | 7/1985 | C10J/3/52 |
| GB | 2099717 A | * | 12/1982 | B01J/8/24 |
| JP | 57070189 A | * | 4/1982 | C10J/3/56 |

* cited by examiner

*Primary Examiner*—Hien Tran
*Assistant Examiner*—Jennifer Leung

(57) ABSTRACT

A fluidized bed reactor (10) for chemically transforming reactants to generate a desired product, having a hollow, elongated, vertically oriented reactor housing (12) for confining the reaction and an unobstructed collection path (18) below the reaction zone for funneling the residue of the process to an exit port (32). A central gas inlet (22) proximate the bottom of the reaction zone within the housing directs gas parallel to the vertical axis of the housing to maintain the raw materials in suspension. A plurality of individually controlled peripheral gas jets (24) positioned at least two elevations along the elongated dimension of the reaction housing (12), and located circumferentially around the housing (12) at each elevation, introduce gas at an angle to promote mixing of the entrained materials in suspension. The clog-free collection path (18) below the reaction zone funnels the residue of the process to an exit port (32) where it is continuously removed by a screw feeder (34). A gas sparger (30) below the reaction zone diverts fine agglomerates of the residue back into the reaction stream to increase the efficiency of the process and minimize the residue.

17 Claims, 1 Drawing Sheet

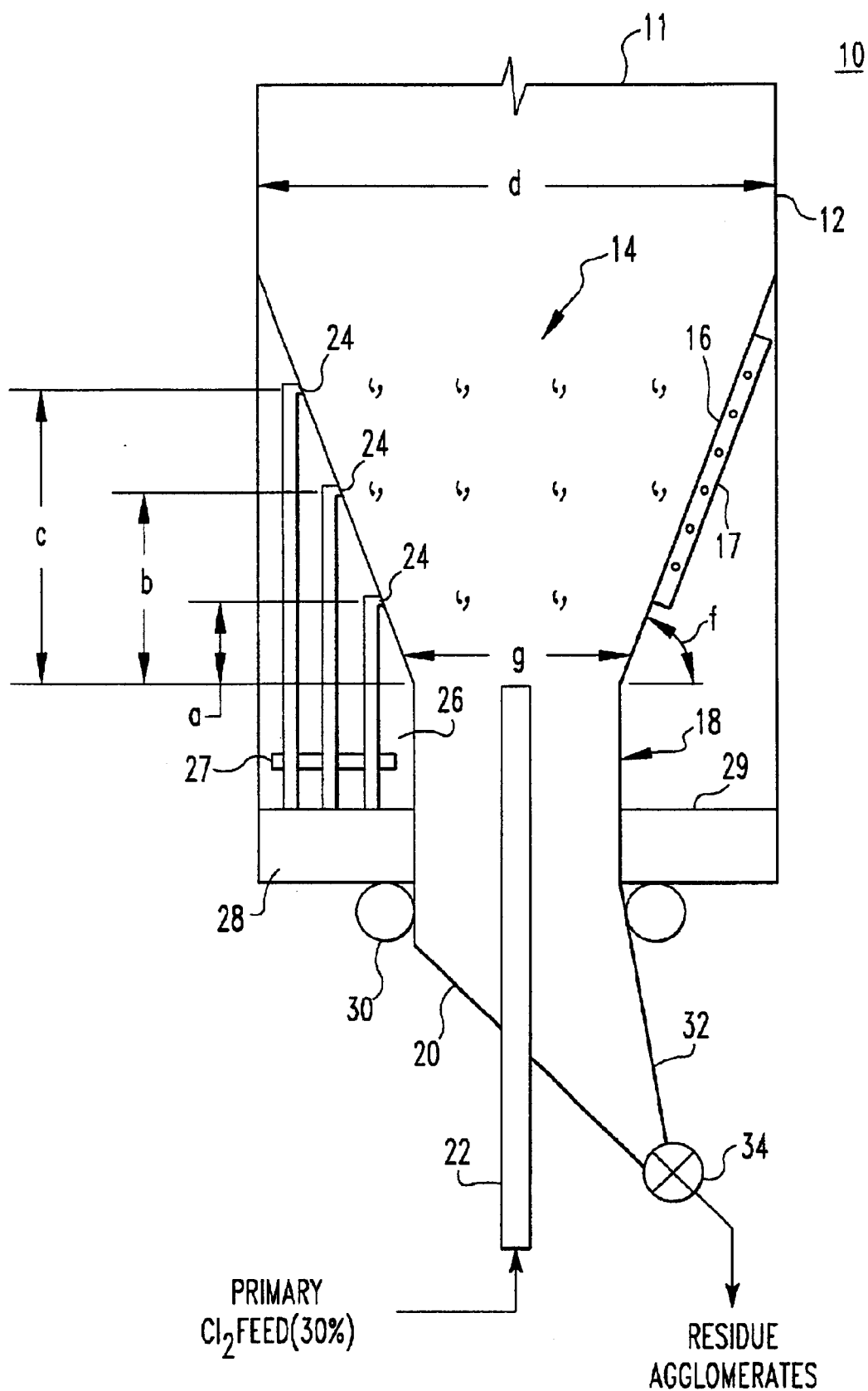

FLUIDIZED BED REACTION DESIGN

BACKGROUND OF THE INVENTION

1. Field of the Invention

This invention pertains in general to fluidized bed reactors and more particularly to fluidized bed reactors that can operate continuously even with a heavy residue yield.

2. Background Information

In the production of metals such as zirconium, hafnium and titanium by the Kroll reduction process, zircon and rutile sands are first chlorinated in the presence of carbon to produce gaseous zirconium, hafnium, titanium and silicon tetrachlorides, which metals are then reduced with, e.g., magnesium. The sands are typically chlorinated in the presence of carbon at temperatures greater than approximately 800° C. in fluidized bed reactors. Non-volatile compounds, and particularly calcium, yttrium, and sodium salts in the zircon and rutile sands, eventually build up in the chlorinators and create "sticky" bed conditions which inhibit fluidization. Thus, the residues in the chlorinators must be periodically removed. Existing production chlorinators operate in a semi-continuous mode where the temperature, pressure and material feed rate are maintained constant while the residual impurities from the feeds are left to accumulate in the fluidized bed reactors. The residue contains impurities, such as $CaCl_2$ and $YCl_3$, which are in molten states at reactor operating conditions and, if left to accumulate in the bed, will freeze up the bed and eventually require reactor shutdown. During production, this occurs every two to four weeks. Each time about 3,000 pounds of residue, typically containing more than 95% coke, is pulled from the bed. This material is required to be disposed of as radioactive waste because of uranium and thorium which also occur in the ore. This operating mode not only hampers the productivity but also increases the waste of raw material and the amount of residue required to be disposed as radioactive material. In order to permit these chlorinators to operate in a truly continuous mode and avoid bed operational problems, the residue needs to be removed from the bed continuously. This is particularly difficult in current fluidized bed designs that employ an array of rocks, below the bed to diffuse and evenly distribute the gas that suspends and entrains the reactants. In chlorinators silica rocks are chosen as the diffuser because of the corrosive nature of the chlorine gas. On the other hand, the bed of rocks forms a trap for the collection of the sticky residue which readily clogs the flow channels that are intended to distribute and diffuse the chlorine gas.

Accordingly, a new fluidized bed reactor design is desired with an improved gas distribution scheme that can suspend, entrain, and mix the reactants without forming an impediment to the collection and removal of process residue. Furthermore, such a design is desired that will facilitate the continual removal of the process residue.

SUMMARY OF THE INVENTION

These and other objects are achieved by this invention, employing an open and unrestricted fluidized bed within the reactor housing without any impediments to the collection and removal of the process residue. A central gas inlet is positioned proximate the bottom of the reaction zone of the fluidized bed reactor housing, for directing gas upwardly through the housing to maintain the raw materials in suspension. A plurality of peripheral gas jets are positioned at at least two elevations along the reactor housing, circumferentially around the housing at each of those elevations, that introduce gas at a defined angle to promote mixing of the entrained materials in suspension. In this way, the reactants are mixed in suspension without positioning a diffuser below the reaction zone. The bottom of the housing is funneled to a collection port to guide the residue under the force of gravity to an exit where the residue can be continuously extracted.

In a preferred embodiment, a gas sparger surrounds an upper portion of the collection zone and introduces the fluidizing gas to direct agglomerates below a predetermined weight back into the reaction zone to increase the efficiency of the process and minimize the residue. In this preferred embodiment, approximately 30% of the fluidizing gas is directed through the central gas stream, 5% through the sparger and 65% through the peripheral gas jets. Individual control of the peripheral gas jets provides operational flexibility.

BRIEF DESCRIPTION OF THE DRAWINGS

The invention as set forth in the claims will become more apparent by reading the following detailed description in conjunction with the accompanying drawing which shows a schematic view of the fluidized bed reactor of this invention.

DESCRIPTION OF THE PREFERRED EMBODIMENTS

This invention provides an improved fluidized bed chemical reactor which enables continuous off-flow of the desired end product of the reaction and continuous or batch on-line discharge of a residue byproduct of the process in a manner that enables the reactor to operate continuously without clogging the fluidized bed. While the preferred embodiment is illustrated in an application to a chlorinator, it should be appreciated that the fluidized bed reactor of this invention can be used to facilitate other chemical reactions, such as coal gasification or combustion processes.

As previously mentioned, the carbochlorination of zircon sand ($ZrSiO_4$) is the first step of a lengthy and complex series of chemical processing steps to produce high purity zirconium metal. The carbochlorination, or crude chlorination, is carried out in a fluidized bed operated at 1000° C. using coke and chlorine. Operation of prior art chlorinators in this application have essentially been semi-continuous. Periodically, the impurities from the ore are accumulated in the fluidized bed and are disposed of as a radioactive waste. The accumulation of impurities in the bed clogs the bed and hampers the operation and lowers the efficiency of the reactor, and increases the disposal costs of the radioactive residue. In addition, to remove the residue the reactor has to be taken off-line. It is an object of this invention to convert this semi-continuous process into a continuous one that enables on-line removal of impurities as agglomerates.

The residue of the process of the chlorination of zirconium ore contains impurities, such as $CaCl_2$ and $YCl_3$ which are in molten states at the reactor operating conditions and, if left to accumulate in the bed, will freeze up the bed and eventually require reactor shutdown. The bed is typically supported by an array of rocks which are used to diffuse the chlorine gas which is employed to suspend, entrain and mix the combination of coke and zirconium ore, as it reacts with the suspended materials.

One preferred embodiment to this invention is shown in FIG. 1 which shows a schematic view of the improved fluidized bed reactor of this invention. The major portion of the reactor 10 is contained within a cylindrical housing 12 that has an upper opening 11 through which the raw ingredients are fed and the final product is discharged. Alternately, the raw ingredients can be fed through the central tube 22. The reactor bed is defined by a conical diffuser plate 16 that contains the reactants sand and coke 14. The bed terminates at its lower end in a cylindrical discharge tube 18 which includes a lower slanted wall 20 that funnels the residue to an outlet 32 at the lower end of the discharge tube 18. The discharge of the residue is facilitated by a screw or rotary feeder 34. Preferably the discharge can be accomplished continuously or it can be accomplished on-line as a batch process.

As previously mentioned, the bed is operated at approximately 1000° C. and is heated by an induction heating system schematically shown by reference character 17. The conical diffuser 16 is preferably constructed out of graphite which facilitates the induction heating process and can withstand the caustic nature of the chlorine gas. The remaining portions of the system interfacing with chlorine can be constructed out of stainless steel.

Chlorine is introduced into the fluidized bed reactor of this invention in three different ways. First, approximately 30% of the chlorine is introduced through a primary inlet or central tube 22 which is centrally disposed along the axis of the reactor extending from below the discharge conduit to the lower portion of the reactor bed. Secondly, approximately 5% of the chlorine is introduced through a sparger 30 which encircles the greater portion of the circumference of an upper portion of the residue discharge conduit or collection or cylindrical discharge tube 18, below the housing 12. The sparger 30 introduces the chlorine at a horizontal or preferably downward angle, e.g., 45°, to the horizontal to prevent particle sifting into the sparger. The downwardly directed gas from the sparger turns in the discharge tube in an upwardly direction towards the bed. The pressure drop through the sparger has to be at least thirty percent of the pressure drop through the whole bed; that is the differential pressures measured between the bottom and top of the bed. The flow rate through the sparger is designed to provide a conducive fluidizing condition to allow segregation and passage of larger agglomerates while forcing the bed particles and finer agglomerates back into the reaction region to minimize the overall residue. The presence of the sparger 30 creates a separate fluidized bed in the discharge tube 18. Operation of the discharge tube 18 at a fluidizing velocity 1.2 to 1.5 times the minimum fluidization velocity of the larger agglomerates to be separated will allow segregation and passage of the larger agglomerates for withdrawal. This is a well-known principle in fluidized bed operation.

The lower portion of the housing 12 forms a plenum 28 which connects through an orifice plate 29 to gas conduits 26 which communicate with the gas orifices 24 within a distribution or conical diffuser plate 16 at at least two spaced elevations and preferably three spaced elevations "a", "b" and "c" as shown in this embodiment. Though only shown on one side, for purposes of illustration, the orifices at each of the three elevations are spaced circumferentially around the distribution plate 16 and preferably the jets at each of the elevations are not aligned. Approximately 65% of the chlorine is distributed through the orifices 24. In this embodiment there are four orifices positioned equidistantly around the lower elevation "a" of the distribution plate and eight orifices equidistantly distributed around the distribution plate at each of the other two elevations. Preferably, the orifice 24 directs the chlorine gas at a slight angle downward to the horizontal, e.g., 10°, to prevent sifting of the powder into the orifices. The orifices are sized and the gas flow from the orifices are designed to allow the orifice jets to penetrate to the middle of the reactor 10. The pressure drop through the orifices are at least 30% of that across the entire bed. Those orifice jets entrain powder and gas continuously and eventually degenerate into bubbles and promote intensive gas and solids mixing and contacting. This design is particularly effective for cohesive powders which cannot be fluidized conventionally. Individual control of each of the orifices 24, as figuratively represented by the controller 27, to adjust flow, provides exceptional operational flexibility. Preferably, all the surfaces of the reactor that contact the gas are constructed from materials such as graphite as previously mentioned or stainless steel, that can withstand the corrosive characteristics of chlorine. Though the embodiment shown in FIG. 1 identifies the number of orifices and the number of jet elevations, the design will be different depending on the size of the chlorinator. In all cases, however, the design will follow the fluidization and gas/solids contacting principles described in this disclosure and will include at least two elevations of jets directing a fluidizing gas directly into the bed.

A pilot reactor was designed for cold flow simulation of this invention. It was found that the large central jet or tube 22 enhances the solid circulation and mixing inside the bed, and promotes a solid flow pattern conducive to agglomeration of impurities. The intensive solids mixing produced by the central jet 22 and the peripheral orifices 24 provides a more uniform temperature in the bed and improves production. In this test, the upper diameter "d" of the bed was approximately 10 inches (25.4 centimeters) and narrowed at its conical lower portion "g" to 4 inches (10.2 centimeters). A 0.5 (1.27 centimeters) inch diameter graphite pipe was employed for the central jet 22 and the orifices in the distribution plate were located 2, 4 and 6 inches above the residue discharge conduit or collection tube 18 and were 0.0787 inches (2 millimeters) in diameter. The slope "f" of the distribution plate 16 was approximately 70° to the horizontal. These relative dimensions can be employed to scale the design from a pilot model to a production reactor size. Accordingly, this invention enables a continuous reaction to be sustained within the fluidized bed without clogging of the bed and enables either continuous or on-line batch removal of the process residue.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A fluidized bed reactor for chlorinating zirconium and rutile sands, i.e., reactant materials, to produce metals such as zirconium, hafnium and titanium comprising:
   a hollow, elongated, vertically oriented reactor housing for confining a reaction of the reactant materials as they are transformed, a portion of the reactor housing confining the reaction of the reactant materials defining a reaction zone;
   a central chlorine gas or chlorine gas and reactant materials inlet proximate the bottom of the reaction zone within the housing for directing chlorine gas or chlorine gas and reactant materials in an upward direction along the vertical axis of the housing into the reaction zone without passing through a solid or perforated diffuser section to maintain the reactant materials in suspension;

a plurality of peripheral chlorine gas inlet jets positioned at at least two elevations along the elongated dimension of the housing for introducing chlorine gas at an angle to the elongated dimension of the housing to promote mixing of the reactant materials in suspension;

a plurality of control valves in fluid communication with a fluidizing chlorine gas supply and respective ones of the plurality of peripheral chlorine gas inlet jets for individually controlling the quantity of chlorine gas passing through the respective plurality of peripheral chlorine gas inlet jets;

a residue collection housing mating at one end with a lower portion of the reactor housing at the bottom of the reaction zone in fluid communication with the reaction zone and having an inclined lower wall for directing a reaction process residue from the reaction zone to a residue collection port through which the residue is extracted from the fluidized bed reactor; and a sparger including a plurality of chlorine gas orifices positioned around at least a portion of the circumference of the interior of the residue collection housing and below the central chlorine gas or chlorine gas and reactant materials inlet for introducing chlorine gas within the residue collection housing to maintain reaction process residue below a given size in suspension and directed back into the reaction zone while enabling agglomerates of reaction process residue above the given size to drop towards the collection port;

wherein the sparger chlorine gas orifices, the plurality of peripheral chlorine gas inlet jets and the central chlorine gas or chlorine gas and reactant materials inlet are sized so the volume of chlorine gas emitted by each is a fixed predetermined ratio that maintains active mixing, minimizes defluidization of the reaction products and promotes reaction of the reactant materials within the reaction zone.

2. The fluidized bed reactor of claim 1 wherein the reactor housing has a conical section circumscribing the reaction zone with the reduced diameter of the conical section at its lower end interfacing with the chlorine gas or chlorine gas and reactant materials inlet.

3. The fluidized bed reactor of claim 1 including a feeder positioned at the residue collection port for removing the residue from the collection housing.

4. The fluidized bed reactor of claim 3 wherein the feeder is a screw or rotary feeder.

5. The fluidized bed reactor of claim 3 wherein the feeder continuously removes the residue from the reactor during operation.

6. The fluidized bed reactor of claim 1 wherein the sparger chlorine gas orifices are directed at a downward angle to the central axis of the collection housing.

7. The fluidized bed reactor of claim 1 wherein the incline of the lower wall of the residue collection housing is designed so that the gravitational forces on the residue above the given size will overcome the wall friction and travel to the collection port.

8. The fluidized bed reactor of claim 1 wherein the plurality of peripheral chlorine gas inlet jets are directed at a downward angle to a line perpendicular to the central axis of the reactor housing.

9. The fluidized bed reactor of claim 1 wherein the central chlorine gas or chlorine gas and reactant materials inlet, the plurality of peripheral chlorine gas inlet jets and sparger are structurally formed so that approximately 30% of a fluidizing chlorine gas is introduced through the central chlorine gas or chlorine gas and reactant materials inlet, approximately 65% of the fluidizing chlorine gas is introduced through the plurality of peripheral chlorine gas inlet jets, and 5% of the fluidizing chlorine gas is introduced through the sparger.

10. The fluidized bed reactor of claim 1 wherein the plurality of peripheral chlorine gas inlet jets includes a plurality of chlorine gas jets at each of said elevations respectively positioned around the circumference of the reactor housing.

11. The fluidized bed reactor of claim 10 wherein the plurality of peripheral chlorine gas inlet jets at each elevation are equidistantly positioned around the circumference of the reactor housing.

12. The fluidized bed reactor of claim 10 wherein the plurality of peripheral chlorine gas inlet jets at each elevation are not aligned with the jets at the other elevations.

13. The fluidized bed reactor of claim 3 wherein the feeder removes the residue from the reactor in batches during operation.

14. The fluidized bed reactor of claim 1 wherein the plurality of peripheral chlorine gas inlet jets are positioned at at least three elevations.

15. The fluidized bed reactor of claim 1 wherein the plurality of peripheral chlorine gas inlet jets are structurally formed so that the pressure drop across the plurality of peripheral chlorine gas inlet jets is at least 30% of the pressure drop across the reaction zone.

16. The fluidized bed reactor of claim 1 wherein the sparger is structurally formed so that the pressure drop across the sparger is at least thirty percent of the pressure drop across the reaction zone.

17. The fluidized bed reactor of claim 1 wherein the reactor housing comprises graphite.

* * * * *